United States Patent
Davidovic et al.

(10) Patent No.: US 9,880,266 B2
(45) Date of Patent: Jan. 30, 2018

(54) MEASUREMENT SYSTEM INCORPORATING AMBIENT LIGHT COMPONENT NULLIFICATION

(71) Applicant: Avago Technologies General IP (Singapore) Pte. Ltd., Singapore (SG)

(72) Inventors: Milos Davidovic, Vienna (AT); Wolfgang Gaberl, Vienna (AT); Gunther Steinle, Regensburg (DE)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 76 days.

(21) Appl. No.: 14/815,266

(22) Filed: Jul. 31, 2015

(65) Prior Publication Data
US 2017/0031008 A1 Feb. 2, 2017

(51) Int. Cl.
  *G01S 7/486* (2006.01)
  *G01J 1/42* (2006.01)
  *G01S 17/08* (2006.01)
  *G01S 7/497* (2006.01)

(52) U.S. Cl.
  CPC ........... *G01S 7/4865* (2013.01); *G01J 1/4204* (2013.01); *G01S 7/497* (2013.01); *G01S 17/08* (2013.01)

(58) Field of Classification Search
  CPC ........... G11C 7/062; G11C 7/067; G11C 7/08; G11C 27/02; G11C 2207/063
  See application file for complete search history.

(56) References Cited

U.S. PATENT DOCUMENTS

| | | | |
|---|---|---|---|
| 7,891,570 B2 | 2/2011 | Difazio et al. | |
| 8,841,595 B2 | 9/2014 | Storm | |
| 2005/0270394 A1* | 12/2005 | Dierickx | H04N 5/37452 348/308 |
| 2014/0049291 A1 | 2/2014 | Soh | |
| 2015/0063048 A1* | 3/2015 | Lin | G11C 7/062 365/210.1 |

FOREIGN PATENT DOCUMENTS

WO 2016000986 A1 1/2016

OTHER PUBLICATIONS

Texas Instruments data sheet titled "AFE4490 Integrated Analog Front-End for Pulse Oximeters" Dec. 2012.

(Continued)

*Primary Examiner* — Luke Ratcliffe

(57) ABSTRACT

An optical measurement system includes a photodetector coupled in series with a field effect transistor (FET) that is a part of a sample and hold circuit. When the sample and hold circuit is in a sampling mode of operation, a voltage bias is applied to the FET and the photodetector is exposed to ambient light, thus resulting in a first current flow through the photodetector. One of several components can be selected in the sample and hold circuit for obtaining a desired time constant. When the sample and hold circuit is subsequently placed in a hold mode of operation, a second current flows through the photodetector due to exposing of the photodetector to a combination of ambient light and light associated with an optical measurement. A portion of the second current that is attributable to the light associated with the optical measurement is used for executing the optical measurement.

22 Claims, 7 Drawing Sheets

(56) References Cited

OTHER PUBLICATIONS

Niclass et al., "Design and Characterization of a CMOS 3-D Image Sensor Based on Single Photon Avalanche Diodes", IEEE Journal of Solid-State Circuits, vol. 40, No. 9, Sep. 2005, pp. 1847-1854.

Shcherbakova et al., "3D Camera Based on Linear-Mode Gain-Modulated Avalanche Photodiodes", ISSCC 2013, Session 27, Image Sensors, 27.7., pp. 491-492.

Brandl et al., "OWC Using a Fully Integrated Optical Receiver With Large-Diameter APD", IEEE Photonics Technology Letters vol. 27, No. 5, Mar. 1, 2015, pp. 482-485.

Davidovic et al., "A 33 × 25 µm$^2$ Low-Power Range Finder", Proc. IEEE International Symposium on Circuits and Systems, p. 922-925, 2012.

Zach et al., "Sunlight-proof optical distance measurements with a dual-line lock-in-time-of-flight sensor", Analog Integr Circ Sig Process (2011) 68: pp. 59-68.

Davidovic et al., "TOF Range Finding Sensor in 90nm CMOS Capable of Supressing 180 klx Ambient light." IEEE Sensors Conference, USA, 2010, pp. 2413-2416.

Zach et al., "A 2×32 range-finding sensor array with pixel-inherent supression of ambient light up to 120klx," IEEE ISSCC 2009, Session 20, Sensors and MEMS, 20.7, pp. 352-354.

\* cited by examiner

MEASUREMENT SYSTEM INCORPORATING AMBIENT LIGHT COMPONENT NULLIFICATION

FIELD OF THE INVENTION

The invention relates to optical measurement systems, and more particularly, to optical measurement systems that incorporate ambient light measurement.

BACKGROUND

Optical measurement systems typically employ one or more photodetectors to detect incident light and then use information derived from the detected light for various purposes. For example, a photodetector incorporated into a digital camera (in the form of an image sensor) can be used to measure light intensities associated with various objects in a scene to be captured by the digital camera. Digital cameras generally include various exposure settings that can be used to address various ambient lighting conditions. The exposure settings can be suitably adjusted after an initial measurement of ambient light is carried out. The initial measurement may be carried out either by using circuitry contained in the digital camera itself or by using an external light meter. However, such ambient light measurements often prove to be rough approximations that do not accurately reflect the actual amount of ambient light that may be present at a particular moment in time when the camera is used to capture an image of an object located at a distance far from the camera.

In some applications other than photography, ambient light measurements can be carried out using various other techniques and procedures. However, in many instances, even the use of these other techniques and procedures fails to provide satisfactory results. For example, ambient light measurement circuitry used in some traditional time-of-flight optical distance measurement systems for measuring ambient light and addressing resulting adverse effects often proves inadequate and less than optimal. This shortcoming may be attributable, at least in part, to the more complex nature of the distance measurement procedure in comparison to various light detection procedures employed in digital cameras, for example.

As is known, a time-of-flight optical distance measurement system operates by transmitting a beam of light towards a target object and then waiting to receive a reflected portion of the emitted light after reflection by the target object. The time delay between transmission of the light beam and receiving of the reflected light is used to calculate the distance between the measurement system and the target object. Understandably, the amount of reflected light can be very small in comparison to the amount of ambient light that may be present in the vicinity of the optical distance measurement system. Existing optical distance measurement systems attempt to eliminate the effects of the ambient light with limited success primarily due to complexities related to determining an optimal length of time (sampling period) that can be used for detecting an amount of ambient light with a satisfactory level of accuracy. An excessively long sampling period can lead to undesirable measurement delays with no guarantees that the ambient light will remain unchanged at the moment when the reflected light actually reaches a detector at a later instant in time. On the other hand, a short sampling period can lead to an improper measurement of the ambient light level.

It is therefore desirable to provide an optical measurement system that addresses at least some of the issues associated with traditional optical measurement systems incorporating ambient light measurement circuitry.

BRIEF DESCRIPTION OF THE FIGURES

Many aspects of the invention can be better understood by referring to the following description in conjunction with the accompanying claims and figures. Like numerals indicate like structural elements and features in the various figures. For clarity, not every element may be labeled with numerals in every figure. The drawings are not necessarily drawn to scale, emphasis instead being placed upon illustrating the principles of the invention. The drawings should not be interpreted as limiting the scope of the invention to the example embodiments shown herein.

WRITTEN DESCRIPTION

Figure 1:
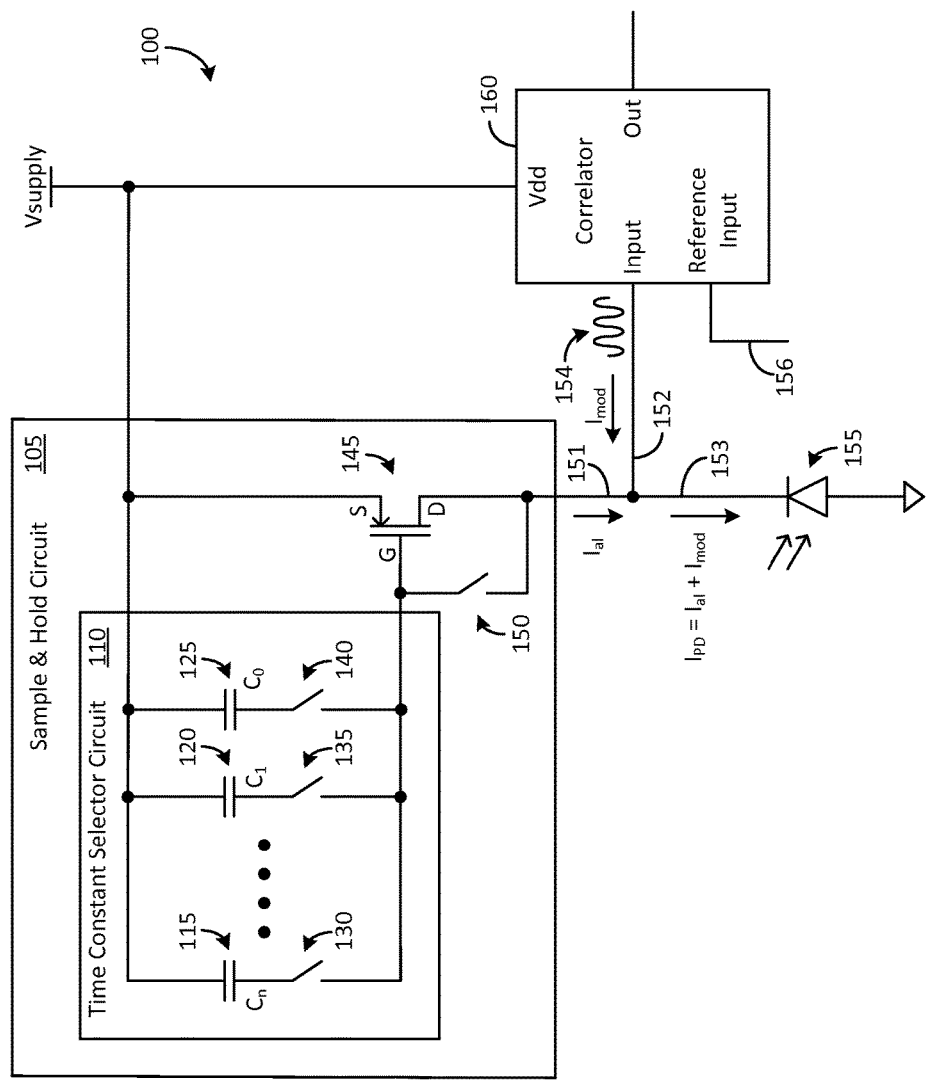
FIG. 1 shows a first exemplary embodiment of an optical measurement system in accordance with the disclosure.

Throughout this description, embodiments and variations are described for the purpose of illustrating uses and implementations of inventive concepts. The illustrative description should be understood as presenting examples of inventive concepts, rather than as limiting the scope of the concept as disclosed herein. It should be further understood that certain words and terms are used herein solely for convenience and such words and terms should be interpreted as referring to various objects and actions that are generally understood in various forms and equivalencies by persons of ordinary skill in the art. For example, the word "switch" generally refers to various types of switching elements such as, for example, a relay or a solid state switch, and the word "photodetector" refers to various kinds of light sensing elements such as, for example, a photodiode, a photocell, or a complementary metal oxide semiconductor (CMOS) imaging sensor. It should also be understood that the word "example" as used herein is intended to be non-exclusionary and non-limiting in nature. More particularly, the word "exemplary" as used herein indicates one among several examples, and it must be understood that no undue emphasis or preference is being directed to the particular example being described.

In terms of a general overview, an optical measurement system in accordance with the disclosure includes a photodetector that is coupled in series with a field effect transistor (FET). The FET is a part of a sample and hold circuit and an amount of current that flows through the photodetector is proportional to a conductivity state of the FET. More particularly, the conductivity state of the FET is determined by a voltage bias that is applied to a gate terminal of the FET when the sample and hold circuit executes a sampling mode of operation. The sampling mode of operation is executed in order to detect an amount of ambient light incident upon the photodetector and to determine therefrom, which one of a plurality of circuit elements is to be selected in a time constant selector circuit of the sample and hold circuit. Each time constant provides a different measurement characteristic when sampling the amount of ambient light incident upon the photodetector. Thus, in accordance with the disclosure, a variety of time constants can be selectively applied when detecting a light signal that is associated with a desired optical measurement even when various ambient light conditions are present.

Optical measurement systems in accordance with the disclosure provide various advantages over traditional optical measurement systems wherein a single, fixed time constant is used irrespective of variances in ambient light. Specifically, an optical measurement system in accordance with the disclosure provides for detection of a desired current flow through a photodetector even in the presence of a large current flow caused by ambient light, thus nullifying adverse effects of the ambient light component upon the detection. The systems and methods described herein may be used in a wide variety of applications, including, for example, in a time-of-flight optical distance measurement system.

Attention is now drawn to FIG. 1, which shows a first exemplary embodiment of an optical measurement system 100 in accordance with the disclosure. Optical measurement system 100 includes a photodetector 155 configured to receive various types of light input associated with a wide variety of applications. For example, in a first application, which is an image capture application, the received light can correspond to light associated with various points on one or more target objects (not shown) that are to be captured in image form. In a second application, which is a time-of-flight optical distance measurement application, the received light can correspond to light reflected by a target object (not shown) in response to a beam of light transmitted by the optical measurement system 100 towards the target object. The time delay between transmission of the light beam by the optical measurement system 100 and receiving of the reflected light in the photodetector 155 is used by the optical measurement system 100 to calculate a distance between the optical measurement system 100 and the target object.

Irrespective of the nature of the application, the photodetector 155 may be exposed to ambient light at the moment in time when the desired light input is incident upon the photodetector 155. In many situations, the intensity of the ambient light may be significantly higher than a desired light input, which can be, for example, reflected light received in a photodetector of a time-of-flight optical distance measurement system. It is therefore desirable to nullify or eliminate the adverse effects of ambient light incident upon the photodetector 155 when the optical measurement system 100 is used for carrying out various types of optical measurements. Nullifying or eliminating the adverse effects of ambient light upon optical measurements can be typically carried out by detecting an amount of current flowing through the photodetector 155 in response to ambient light that is present when a measurement procedure is initiated by the optical measurement system 100 and then taking the detected current flow into consideration when the photodetector 155 subsequently receives a desired light signal in the presence of the ambient light. These aspects will be described below in further detail.

The photodetector 155 is coupled in series with a FET 145 that is a part of a sample and hold circuit 105. It should be understood that in other embodiments, other kinds of transistors can be used in place of the FET 145. The sample and hold circuit 105 includes a sampling switch 150 that can be used to couple a gate terminal of the FET 145 to a drain terminal of the FET 145, and further includes a time constant selector circuit 110. In this example embodiment, the time constant selector circuit 110 incorporates an array of capacitors coupled in parallel with each other. One or more of the "n" capacitors (n≥2) that constitute the array of capacitors can be selectively coupled between the gate terminal of the FET 145 and a source terminal of the FET 145 by actuating one or more respective switches in an array of switches connected to the array of capacitors. For example, a capacitor 115 can be selectively coupled between the gate terminal of the FET 145 and the source terminal of the FET 145 by actuating a switch 130 that is connected to the capacitor 115. Similarly, each of a capacitor 120 and a capacitor 125 can be selectively coupled by actuating a switch 135 and a switch 140, respectively.

In one example implementation, all of the "n" capacitors are identical to each other. However, in another example implementation, two or more of the "n" capacitors can have different values. The different values can have either a linear relationship or a non-linear relationship and can also be selected on the basis of a weighting scheme (e.g., a binary weighting scheme). In yet another example implementation, at least one of the "n" capacitors can be directly connected between the gate terminal and the source terminal of the FET 145 without incorporating a selector switch. Such a capacitor may have a nominal, predetermined value.

The operation of the various components of the optical measurement system 100 will now be described in further detail. The sample and hold circuit 105 is first placed in a sampling mode of operation by placing switch 150 in a closed position, thereby directly coupling the gate terminal ("G") of the FET 145 to the drain terminal ("D") of the FET 145. At least one of the switch 130, the switch 135, and the switch 140 is also placed in a closed position so as to include at least one capacitor between the gate terminal of the FET 145 and the source terminal of the FET 145. For example, the switch 140 can be first placed in a closed position so as to include the capacitor 125 between the gate terminal of the FET 145 and the source terminal of the FET 145.

The sampling mode of operation is directed at selecting an appropriate time constant that provides a desired level of measurement accuracy when the optical measurement system 100 is used for detecting ambient light present in the vicinity of the optical measurement system 100. During the sampling mode of operation, the correlator 160 can be placed in an inactive state. In certain applications, the level of measurement accuracy may be further enhanced by preventing light other than ambient light from being incident upon the photodetector 155. Thus, for example, when the optical measurement system 100 is a time-of-flight distance measurement system, the sampling mode of operation can be activated when no light has been transmitted by the time-of-flight distance measurement system towards a target object, thereby precluding reflected light from the target object being incident upon the photodetector 155.

When the sample and hold circuit 105 is placed in the sampling mode of operation, the photodetector 155 has a current conductivity that is proportional to the intensity of the ambient light falling upon the photodetector 155. The current conductivity results in a source-to-drain current (labeled "$I_{al}$") being drawn through the FET 145 and propagating via a line 151 to the photodetector 155.

A time constant "T" associated with the source-to-drain current ("$I_{al}$") propagating through the FET 145 is determined by the value of the capacitor 125 that was coupled between the gate terminal of the FET 145 and the source terminal of the FET 145 by actuating the switch 140. The time constant "T" can be represented by the following equation: $\Gamma \propto C_{nom}/\sqrt{(I_{PD})}$ where $C_{nom}$ in this case corresponds to the value of the capacitor 125 and $I_{PD}$ is the current propagating through the photodetector 155. Understandably, the time constant "T" can be modified by changing the value of $C_{nom}$. Therefore, if a greater time constant "T" is desired, additional capacitors from among the "n" capacitors (capacitor 115, capacitor 120, capacitor 125 etc.) can be introduced between the gate terminal and the source terminal of the FET 145 by actuating the appropriate one of the "n" switches (i.e., switch 130, switch 135, switch 140, etc.). Furthermore, in some applications, when one or more among the "n" additional capacitors are selected, the capacitor 125 may be disconnected from between the gate terminal and source terminal of the FET 145 by actuating the switch 140 to an open position. The capacitor 125 may be disconnected, for example, in order to introduce another one of the "n" capacitors that has a lower capacitance value, thus reducing the time constant "Γ," if so desired. Determining an optimum value of the time constant "T" is dependent on various parameters such as, for example, measurement speed and measurement accuracy. Consequently, in some cases selecting the time constant "T" may be based on making a tradeoff between two or more such parameters. The selection of one or more among the "n" additional capacitors can be carried out manually or automatically. A few exemplary systems for performing the selection automatically are described below with reference to other figures.

Upon completion of the sampling mode of operation, the sample and hold circuit 105 is placed in a hold mode of operation during which the sampling switch 150 is placed in an open position and the selected capacitor from amongst the "n" capacitors is left connected between the gate terminal and the source terminal of the FET 145. The connection of the selected capacitor between the gate terminal and the source terminal of the FET 145 causes the sample and hold circuit 105 to provide a desired time constant for current flowing through the photodetector 155 during the hold mode of operation.

During the hold mode of operation, the optical measurement system 100 is in an operating condition that allows a desired light signal to be incident upon the photodetector 155. Specifically, during the hold mode of operation, the amount of light incident upon the photodetector 155 is a combination of ambient light and the desired light signal, thus resulting in a change in the nature of current flowing through the photodetector 155, which is indicated in FIG. 1 as a current flow "$I_{PD}=I_{al}+I_{mod}$." The change in nature of this current flow is directly proportional to the intensity of the desired light signal, and this feature can be advantageously used in accordance with the disclosure for nullifying adverse effects of ambient light upon optical measurements.

Thus, for example, when the optical measurement system 100 is a time-of-flight distance measurement system, the hold mode of operation can be activated after a modulated beam of light has been transmitted by the time-of-flight distance measurement system towards a target object. A portion of the modulated beam of light is reflected from the target object and is incident upon the photodetector 155, thus leading to the current flow "$I_{PD}=I_{al}+I_{mod}$" through the photodetector 155. During the hold mode of operation, the correlator 160 is placed in an active state. When in the active state, the correlator 160 uses the $I_{mod}$ current propagating through the line 152 in order to carry out a distance measurement operation.

In one example implementation, a digital clock signal may be used to generate the modulated beam of light that is transmitted by the time-of-flight distance measurement system towards the target object. Typically as a result of bandwidth limitations, the modulated beam of light transmitted out of the time-of-flight distance measurement system has a sinewave characteristic rather than a square wave or a rectangular wave characteristic. Consequently, light that is reflected by the target object and incident upon the photodetector 155 also has a sinewave characteristic, thus resulting in the "$I_{PD}$" current flowing through the photodetector 155 having a sinewave current component ("$I_{mod}$"). The sinewave current component ("$I_{mod}$") is propagated to the photodetector 155 via line 152, and is indicated in FIG. 1 as a sinewave pattern 154.

One or more parameters of the sinewave pattern 154 is used by the correlator 160 for comparing against one or more parameters of a reference input signal that is coupled into the correlator 160 via a line 156. The reference input signal, which can be the digital clock signal that was originally used for modulating the emitted beam of light, is used by the correlator 160 to process the sinewave current component ("$I_{mod}$") and derive a distance measurement result. For example, the correlator 160 can measure a phase offset between the reference input signal and the sinewave current component ("$I_{mod}$") and use the measured phase offset to determine a round trip time of the modulated beam. The round trip time can then be used to calculate a distance between the time-of-flight distance measurement system and the target object. In an alternative approach, in lieu of a phase offset measurement, a time delay measurement may be carried out, for example, when the transmitted signal is a light impulse signal and the reference input signal provided to the correlator 160 is a trigger pulse that was used for generating the light impulse signal.

Figure 2:
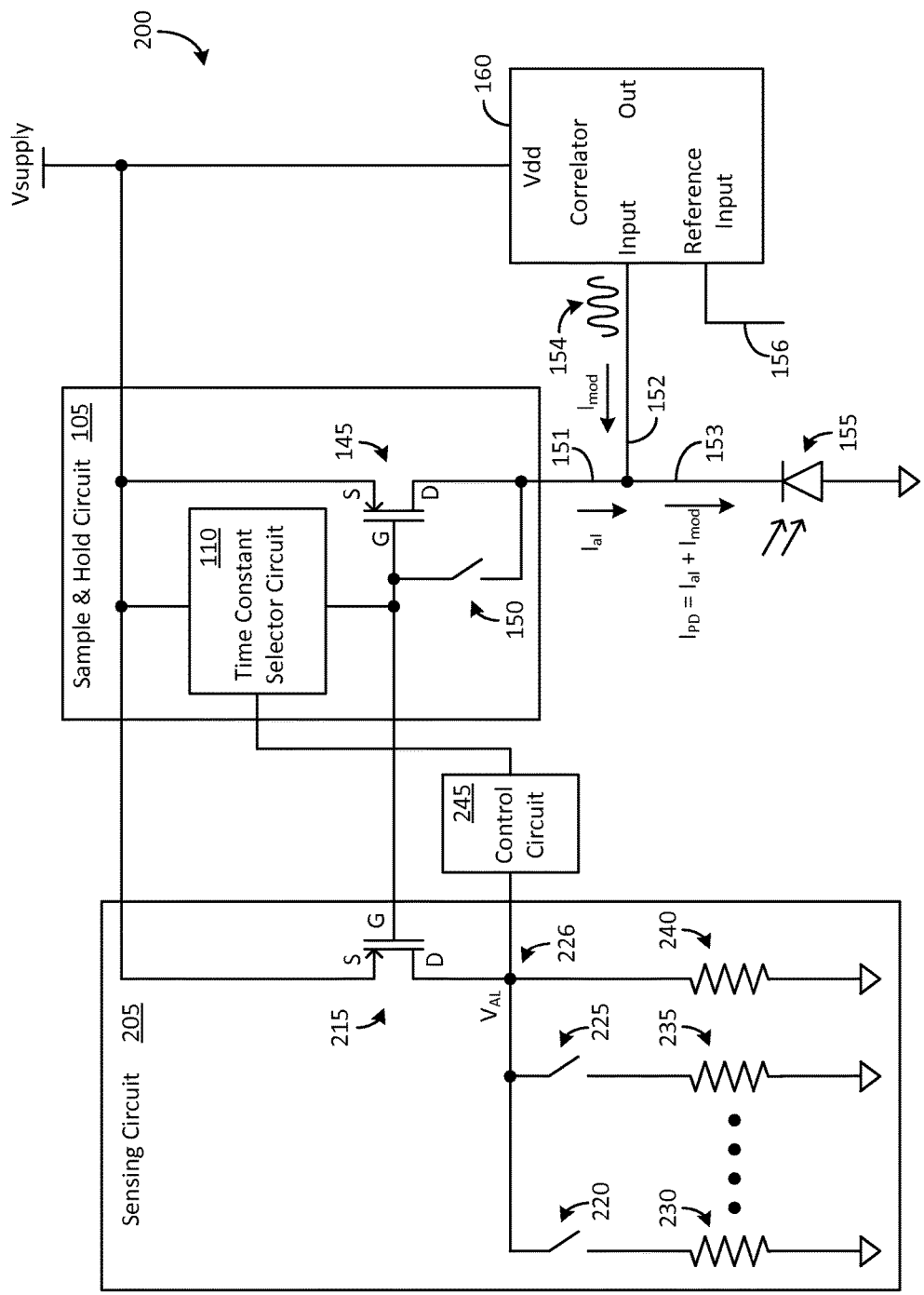
FIG. 2 shows a second exemplary embodiment of an optical measurement system in accordance with the disclosure.

FIG. 2 shows a second exemplary embodiment of an optical measurement system 200 in accordance with the disclosure. The optical measurement system 200 includes the photodetector 155, the sample and hold circuit 105, and the correlator 160 that are also components of the optical measurement system 100 shown in FIG. 1. In addition to these components, the optical measurement system 200 further includes a sensing circuit 205. The sensing circuit 205 has a FET 215 that is coupled in a current mirror circuit arrangement with the FET 145. A drain terminal of the FET 215 is coupled to an array of "n" resistors (resistor 240, resistor 235 and "$n^{th}$" resistor 230). In one example implementation, the FET 215 is identical to the FET 145. However, in another example implementation, the FET 215 is different than the FET 145. For example, the FET 215 can incorporate a weighting factor such as a different width-to-length (W/L) ratio than the W/L ratio of the FET 145. As a result of the different weighting factor, such as for example a N:1 weighting factor, a mirrored current flowing through the FET 215 is "N" times a current flowing through the FET 145.

When the optical measurement system 200 is placed in the sampling mode of operation, the photodetector 155 has a certain conductivity that is proportional to the intensity of the ambient light falling upon the photodetector 155. This conductivity results in a source-to-drain current (labeled "$I_{al}$") being drawn through the FET 145. A time constant associated with the source-to-drain current ("$I_{al}$") through the FET 145 is determined by a first capacitor (such as a capacitor having a nominal value) that is a part of the time constant selector circuit 110. The first capacitor may be coupled between the gate terminal and the source terminal of the FET 145 by default (i.e., without carrying out a selection action via a selector switch located inside the time constant selector circuit 110) or may be selectively coupled using a switch, as described above. The sensing circuit 205 can then be used to measure the "$I_{al}$" current flowing through the FET 145 and provide the measurement information to a control circuit (not shown) that is used for selecting additional capacitors located in the time constant selector circuit 110, if so desired.

After selecting the additional capacitors, the sensing circuit 205 can be once again used to measure the changed current flow through the FET 145 and provide new measurement information to the control circuit. The measurement procedure can be carried out recursively until a satisfactory time constant functionality is obtained. The sample and hold circuit 105 can be placed in the hold mode of operation after the time constant selector circuit has been suitably configured to provide a desired time constant.

In the exemplary embodiment shown in FIG. 2, the current flow measurement information is derived from a voltage ("$V_{AL}$") that is present at a node 226. Because the current flowing through the FET 215 is a replica of the current flowing through the FET 145 (or a scaled replica when the FET 215 is a weighted version of the FET 145), the voltage at the node 226 is indicative of various characteristics of the current flowing through the FET 145. These various characteristics can be evaluated if so desired, to determine whether a selected time constant provided by the time constant selector circuit is appropriate for use when detecting a level of ambient light that may be incident upon the photodetector 155 whenever the sample and hold circuit 105 is placed in the sampling mode of operation. Furthermore, the voltage at the node 226 can be used by a control circuit 245 to generate one or more control signals that are coupled to the time constant selector circuit 110 for actuating one or more switches such as, for example, one or more of the switch 130, the switch 135, or the switch 140 shown in FIG. 1.

The amplitude of the voltage at the node 226 can be increased or decreased by suitably selecting one or more of the resistors (other than the resistor 240 that is directly connected to the drain terminal of the FET 215), so as to increase the source to drain current flowing through the FET 215. In various other example implementations, one or more of the "n" resistors (resistor 240, resistor 235, resistor 230 etc.) can be replaced by other components such as, for example potentiometers, diodes, or transistors. The transistors can be bipolar transistors or MOSFET transistors that have a non-linear transfer characteristic (such as for example, a square root transfer characteristic or a logarithmic transfer characteristic) thus providing a large dynamic range of measured current values.

Figure 3:
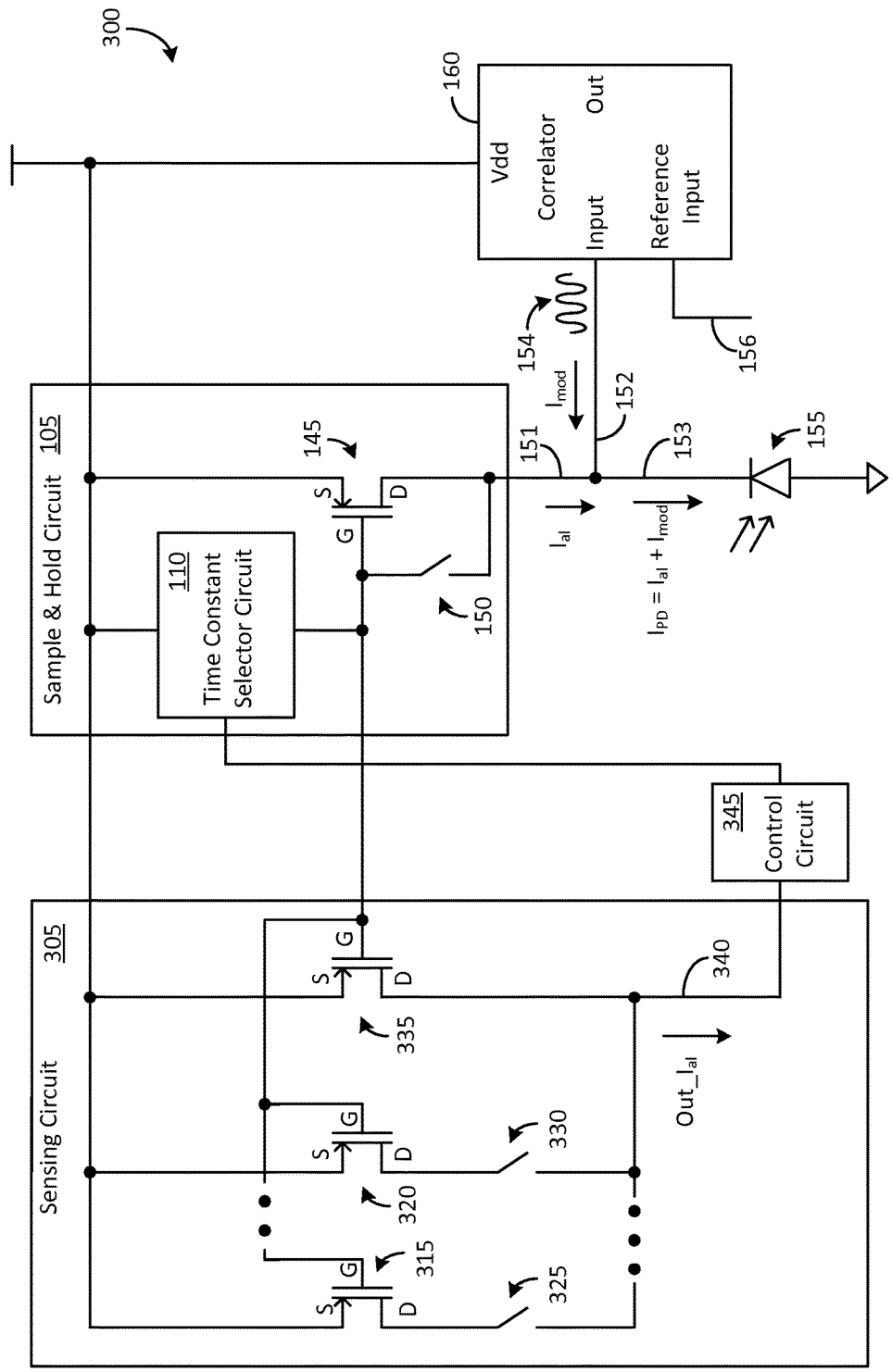
FIG. 3 shows a third exemplary embodiment of an optical measurement system in accordance with the disclosure.

FIG. 3 shows a third exemplary embodiment of an optical measurement system 300 in accordance with the disclosure. The optical measurement system 300 resembles the optical measurement system 200 in terms of including the photodetector 155, the sample and hold circuit 105, the correlator 160, and a sensing circuit 305. However, the nature of the sensing circuit 305 of the optical measurement system 300 is different than the sensing circuit 205 of the optical measurement system 200. Primarily, in contrast to the sensing circuit 205, which is configured to provide measurement information in the form of a voltage at the node 226, the sensing circuit 305 is configured to provide measurement information in the form of a current flow ("Out_Ial") out of a line 340.

The sensing circuit 305 includes an array of "n" FETs coupled in a current mirror circuit arrangement with the FET 145. The array of "n" FETs can include a FET 335 that is configured as a default FET with a drain terminal of the FET 335 coupled to the line 340. Each of the remaining "n−1" FETs of the array of "n" FETs can be selectively coupled to the line 340 by operating one or more of "n−1" switches (switch 330, switch 325, etc.). Each of the "n" FETS can be identical to one another or can be selected to provide different weighting factors (by having various width-to-length (W/L) ratios, for example).

The behavior of certain elements of the optical measurement system 300, such as the sample and hold circuit 105 and the photodetector 155, is similar to that of the optical measurement system 200 described above and will not be repeated herein in the interest of brevity. As for the sensing circuit 305, one or more of the "n−1" FETs (FET 320, FET 315, etc.) can be configured to provide an additive current flow through the line 340 based on a recursive procedure (similar to the one described above with respect to the optical measurement system 200) for obtaining a desired time constant for an "$I_{al}$" current flow through the FET 145. The current ("Out_Ial") flowing out of the line 340 can be used by a control circuit 345 to generate one or more control signals that are coupled to the time constant selector circuit 110 for actuating one or more switches such as, for example, one or more of the switch 130, the switch 135, or the switch 140 shown in FIG. 1.

Figure 4:
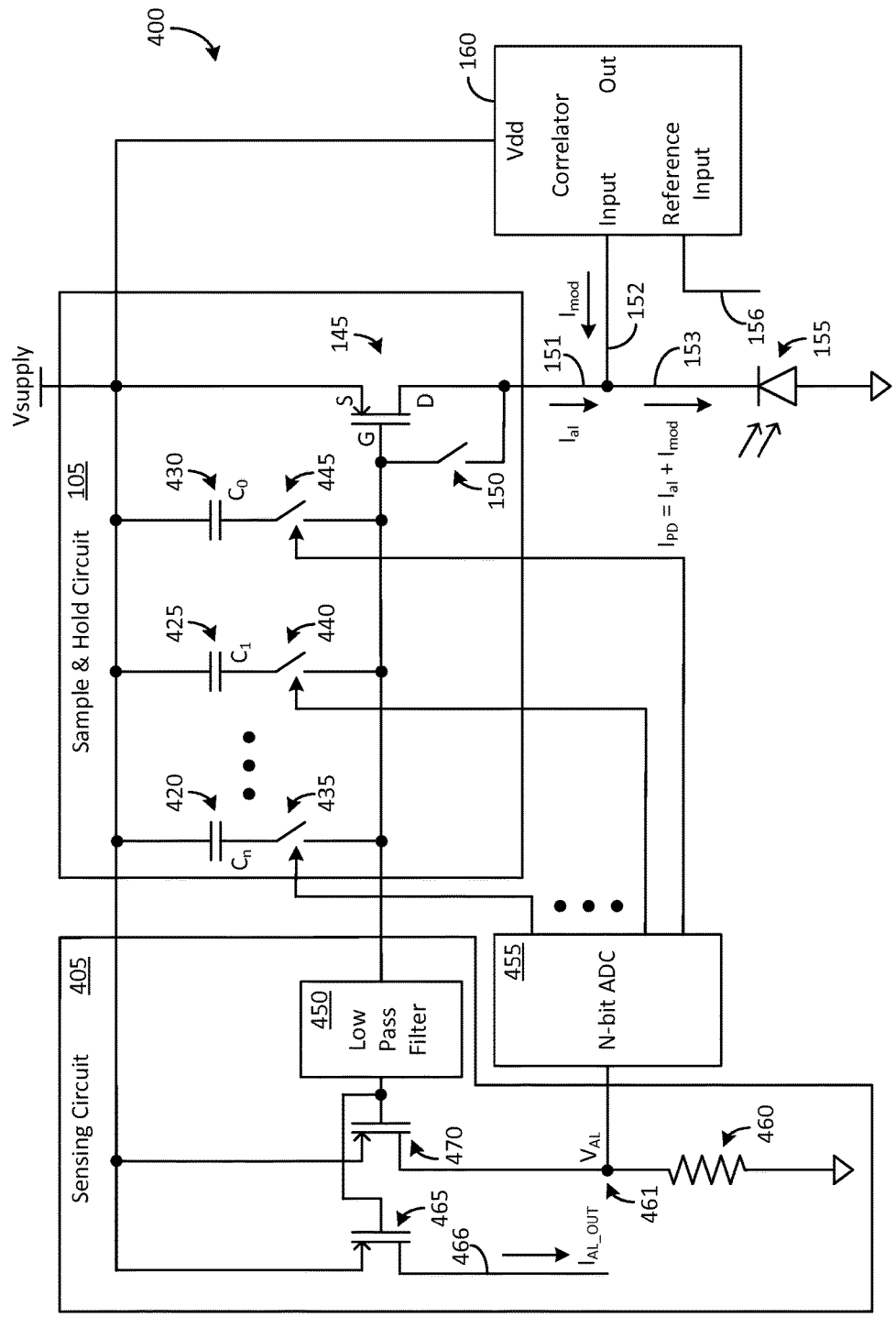
FIG. 4 shows a fourth exemplary embodiment of an optical measurement system in accordance with the disclosure.

FIG. 4 shows a fourth exemplary embodiment of an optical measurement system 400 in accordance with the disclosure. The optical measurement system 400 includes a sensing circuit 405 that resembles a combination of the sensing circuit 205 and the sensing circuit 305 described above. More particularly, the sensing circuit 405 includes a FET 465 having a drain terminal that provides a current "$I_{AL\_OUT}$" that is proportional to the source-to-drain current of the FET 145 and can be used for measurement purposes. The sensing circuit 405 further includes another FET 470 having a drain terminal that is coupled to a resistor 460 (or another element such as a diode or a transistor). A node 461 located at a junction of the drain terminal of the FET 470 and the resistor 460 provides a voltage "$V_{AL}$" that is proportional to the source-to-drain current of the FET 145.

The voltage "$V_{AL}$" is coupled into a control circuit. In this fourth exemplary embodiment, the control circuit is an N-bit analog-to-digital converter (ADC) 455. The N-bit size of the N-bit ADC 455 can be selected on the basis of the number "n" of switches (switch 445, switch 440, and "$n^{th}$" switch 435) that are to be controlled by the ADC 455. The N-bit ADC 455 converts the voltage "$V_{AL}$" into a corresponding digital output that actuates one or more of the "n" switches. Thus, when the sample and hold circuit 105 is placed in the sampling mode of operation, the one or more values of the voltage "$V_{AL}$" that is generated at the node 461 as a result of a mirrored current flow through the FET 470 is used to selectively couple one or more of the capacitor 430, the capacitor 425, or the "$n^{th}$" capacitor 420 between the gate terminal and the source terminal of the FET 145. As described above, this action is carried out in order to set an appropriate time constant to a current flowing through the photodetector 155 when the sample and hold circuit 105 is subsequently placed in the hold mode of operation.

In this exemplary embodiment, the current "$I_{AL\_OUT}$" is not used. However, in other embodiments, the current "$I_{AL\_OUT}$" can be used in addition to, or in lieu of, the voltage "$V_{AL}$" in order to operate as a sense signal that is provided to a control circuit (not shown) for configuring one or more of the "n" switches (switch 445, switch 440, and switch 435).

Furthermore, in this exemplary embodiment, a low pass filter (LPF) 450 is shown coupled between the gate terminal of the FET 145 and the gate terminal of the FET 470. The low pass filter 450 is operative to block certain noise components from adversely affecting ambient light measurements. Such noise components include what is known in the art as kTC noise. The low pass filter 450 is an optional element and can be omitted in other embodiments.

Different types of ADCs can be used for the N-bit ADC 455 in various implementations. In a first example implementation, the N-bit ADC 455 is configured to carry out the analog-to-digital conversion using a logarithmic conversion ratio. In a second example implementation, the N-bit ADC 455 is configured to carry out the analog-to-digital conversion using an exponential conversion ratio.

Figure 5:
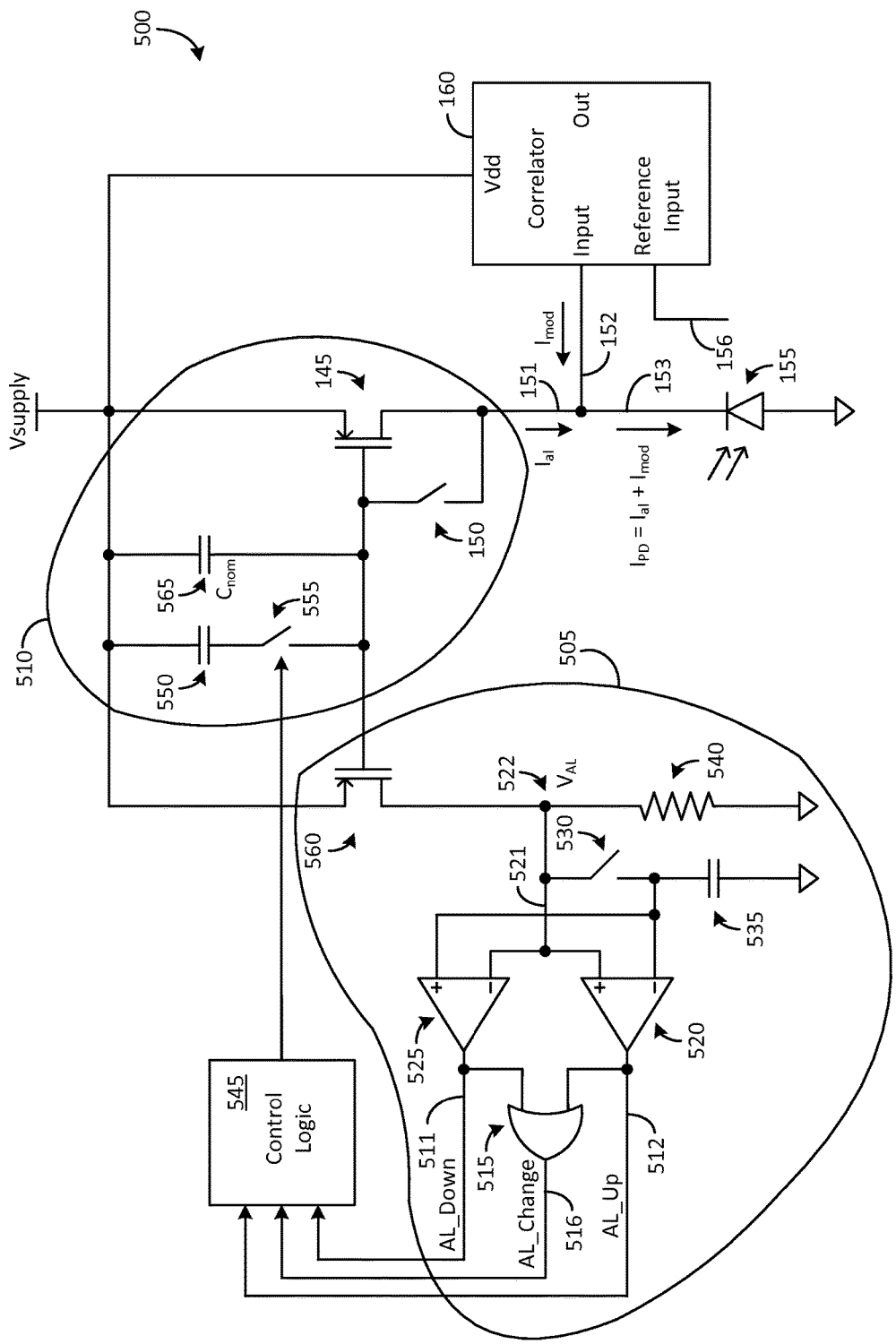
FIG. 5 shows a fifth exemplary embodiment of an optical measurement system in accordance with the disclosure.

FIG. 5 shows a fifth exemplary embodiment of an optical measurement system 500 in accordance with the disclosure. The optical measurement system 500 includes a sensing circuit 505 which can be used for generating multiple sense signals that are provided to the control logic 545. The multiple sense signals are indicative of changes in ambient light levels over various periods of time. The control logic 545 uses these multiple sense signals to generate one or more control signals for actuating one or more switches. In this example embodiment, a switch 555 is shown coupled to a capacitor 550 so as to enable selective inclusion of the capacitor 550 between the gate terminal and the source terminal of the FET 145. In other embodiments, more than one capacitor-switch combination can be used, and an appropriate number of control signals provided from the control logic 545 to control these various switches. Furthermore, in this example embodiment, a capacitor 565 is directly coupled between the gate terminal and the source terminal of the FET 145. The capacitor 565 can have a nominal value that is selected on the basis of on an approximate estimation of a desired time constant.

The sensing circuit 505 includes a first comparator 525 and a second comparator 520 each arranged to receive a "$V_{AL}$" voltage (described above) that is present at the node 522. Specifically, the "$V_{AL}$" voltage is coupled into a negative input terminal of the first comparator 525 and a positive input terminal of the second comparator 520. A corresponding positive input terminal of the first comparator 525 and a negative input terminal of the second comparator 520 are both coupled to a sampling capacitor 535 that can be selectively coupled to the node 522 by actuating a switch 530.

The switch 530 is activated in order to charge the sampling capacitor 535 with a first voltage level "$V_{AL}$" that is present at the node 522 at a certain point in time. At this point in time, the sample and hold circuit 510 has been placed in a sampling mode of operation by actuating switch 150 to a closed position. The current flowing through the FET 145 during the sampling mode of operation is proportional to an amount of ambient light that is incident upon the photodetector 155 at this time. This current is mirrored by current flow through the FET 560, which in turn sets the node 522 to the first voltage level "$V_{AL}$" corresponding to the amount of light incident upon the photodetector 155 at this time. The capacitor 535 charges to this first voltage level "$V_{AL}$," after which the switch 530 is placed in an open position so as to allow the capacitor 535 to hold the charge. The sensing outputs of the sensing circuit 505 are not used at this juncture.

At a later instant in time after the sample and hold circuit 510 has been placed in a hold state of operation for some period of time by opening switch 150 (in order to measure an amount of desired light incident upon the photodetector 155), the sample and hold circuit 510 is once again placed in a sampling mode of operation by actuating switch 150 to a closed position. The current flowing through the FET 145 during this sampling mode of operation is proportional to an amount of ambient light that is incident upon the photodetector 155 at this time. If the amount of ambient light has changed since the previous sampling mode of operation was executed, the node 522 will now be at a second voltage level "$V_{AL}$" which is different than the first voltage level "$V_{AL}$" that is stored in the capacitor 535.

If the second voltage level "$V_{AL}$" is greater than the first voltage level "$V_{AL}$," the output of the second comparator 520 will be asserted (for example, by changing from a low logic level to a high logic level). On the other hand, if the second voltage level "$V_{AL}$" is less than the first voltage level "$V_{AL}$," the output of the first comparator 525 will be asserted (for example, by changing from a low logic level to a high logic level). If the output of either the first comparator 525 or the second comparator 520 is asserted, an output of an OR gate 515, which is coupled to each of the outputs of the first comparator 525 and the second comparator 520, is asserted. Thus, the output of the OR gate 515 is indicative of any change in ambient light condition; the output of the first comparator 525 is indicative of a decrease in an amount of ambient light incident upon the photodetector 155; and the output of the second comparator 520 is indicative of an increase in an amount of ambient light incident upon the photodetector 155.

In some implementations, an input offset may be provided in one or both of the first comparator 525 and the second comparator 520 so that small changes in the ambient light incident upon the photodetector 155 are ignored. Such a configuration also prevents the occurrence of an indeterminate or erroneous output condition when the voltage "$V_{AL}$" is very close but not identical, to the voltage stored in the capacitor 535 during a sensing period. In some cases, an embedded offset in one or both of the first comparator 525 and the second comparator 520 may be adequate for addressing such issues.

The sense signal outputs of each of the first comparator 525, the second comparator 520, and the OR gate 515 are coupled into the control logic 545, which monitors these sense signals and generates a control signal to suitably operate the switch 555. For example, the control logic 545 may generate the control signal in order to increase a time constant in the sample and hold circuit 510 by including the capacitor 550 between the gate terminal and the source terminal of the FET 145 in parallel with the capacitor 565. In other implementations, more than one control signal can be generated by the control logic 545 in order to drive one or more other switches (not shown) that are similar to the switch 555.

The control logic 545 can be implemented in a variety of ways. In one example implementation, the control logic 545 is composed solely of logic gates that execute combinatorial logic for generating the control signal. In another example implementation, the control logic 545 can include a processor and associated circuitry for generating the control signal. When a processor is used, one or more of the outputs of each of the first comparator 525, the second comparator 520, and the OR gate 515 can be suitably modulated using modulating circuitry (not shown) in order to transport information. For example, information can be transported from the sensing circuit 505 to the control logic 545 (or to other elements) using a modulation rate of several hundred kilohertz.

Furthermore, in some other implementations, a single comparator can be used in place of the two comparators (i.e., in place of the first comparator 525 and the second comparator 520) if only one sense signal that is indicative of an ambient light level change is desired. The single comparator can incorporate hysteresis in order to avoid indeterminate or erroneous outputs.

Figure 6:
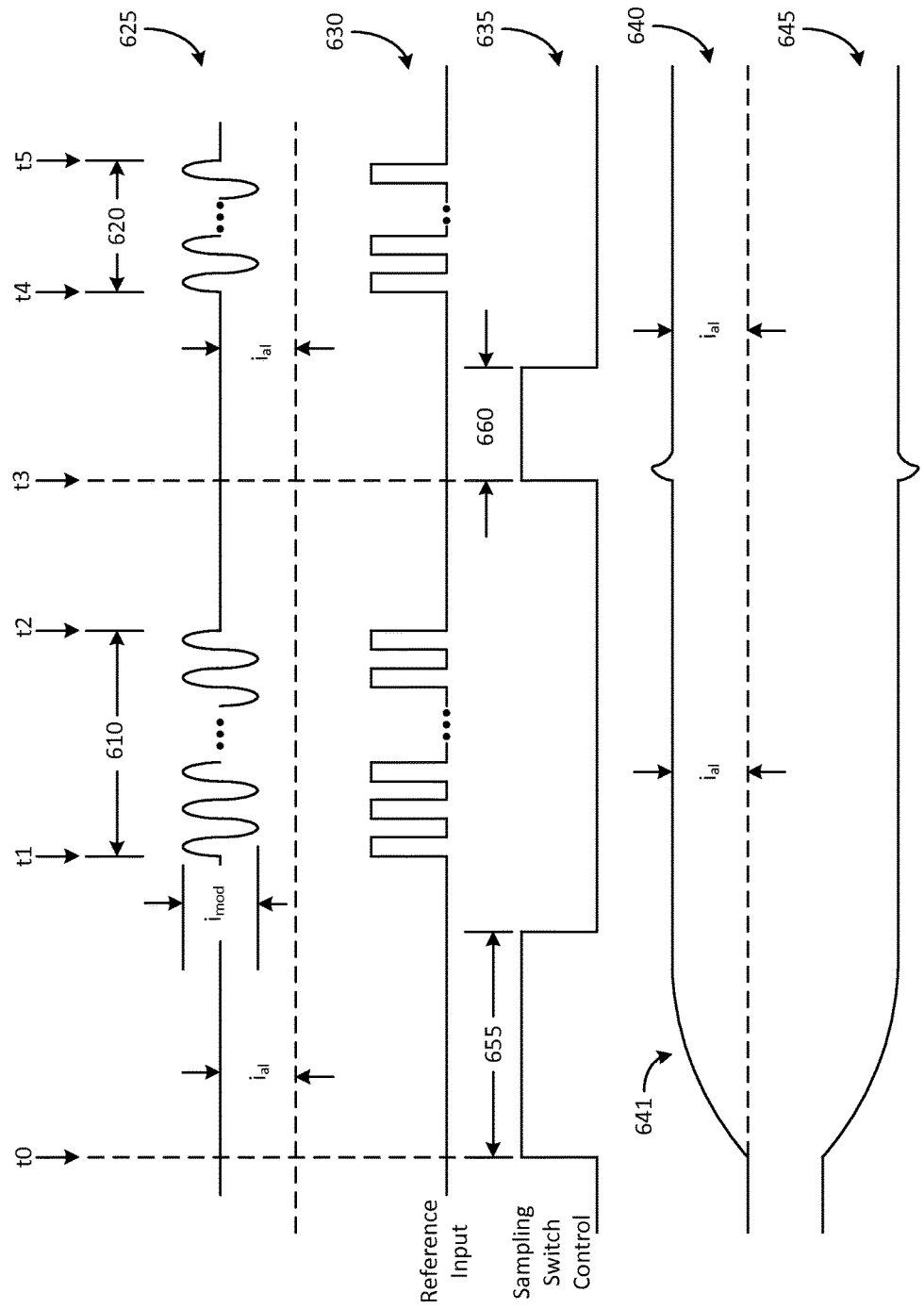
FIG. 6 shows some waveforms associated with a first exemplary optical measurement in accordance with the disclosure.

FIG. 6 shows some waveforms associated with a first exemplary optical measurement in accordance with the disclosure. The example embodiment shown in FIG. 5 will be used hereinafter as a matter of convenience for purposes of describing these waveforms. However it should be understood that the description is equally applicable to the other example embodiments that are shown in other figures.

Waveform 625 reflects the $I_{al}$ and $I_{mod}$ currents propagating through the photodetector 155 at various instants in time. In this example embodiment, the waveform 625 indicates a sinewave pattern that is present in the $I_{mod}$ current component propagating through the photodetector 155 during the hold mode of operation. As described above, the sinewave pattern 154 is used by the correlator 160 for executing various types of measurements.

Waveform 630 reflects the signal present at the reference input of the correlator 160. In this example embodiment, the waveform 630 is indicated in the form of a pulse train that was used to generate a transmitted optical signal. The waveform 635 reflects a sampling switch control signal that is applied to the switch 150 for actuating the switch 150. Attention is drawn to the instant "t0" that corresponds to a startup calibration instant where the switch control signal applied to the switch 150 transitions to a switch actuating condition (logic high level in this example). As a result, the switch 150 transitions from an open position to a closed position and the sample and hold circuit 510 is placed in a startup sampling mode of operation. The startup mode of operation can be alternatively referred to as an initial calibration mode of operation.

A sampling current "$I_{al}$" begins to flow through the FET 145. The amplitude of the sampling current "$I_{al}$" which is proportional to an amount of ambient light that is incident upon the photodetector 155 at time "$t_0$," is shown in waveform 640 (with an equivalent voltage characteristic shown in the waveform 645). The waveform 640 indicates a rise time 641 over the time period 655 during which the switch 150 is in the closed position and the nominal value capacitor 565 is coupled across the gate terminal and the source terminal of the FET 145 in accordance with a default time constant. The switch 530, which is a part of the sensing circuit 505, is placed in a closed position during the time period 655, thereby inhibiting the generation of the multiple sense signals of the sensing circuit 505.

At time "t1" the sampling switch control signal (waveform 635) has transitioned to a logic low level thereby placing the switch 150 in an open position and the sample and hold circuit 510 in a hold mode of operation. The current ("$I_{PD}$") flowing through the photodetector 155 is now a combination of an "$I_{al}$" current and an "$I_{mod}$" current. The effect of the "$I_{mod}$" current is indicated by the sinewave pattern in the waveform 625 over the time period 610 (which reflects the sinewave pattern 154 shown in FIG. 1). During the time period 610, the switch 530 is in an open position and the corresponding sense signals are generated by the sensing circuit 505. The sense signals are provided to the control logic 545 for activating the switch 555 at time "t3." The time period 610 corresponds to a first optical measurement (for example, a distance measurement) that is performed after the initial calibration mode of operation (time period 655) has been performed.

In this example, at time "t3," the amount of ambient light incident upon the photodetector 155 has not changed to an extent that is adequate to generate one of the multiple sense signals from the sensing circuit 505. This lack of change in ambient light is indicated in the "$I_{al}$" state shown in the waveform 640 and in the waveform 625. The time period 660 that extends from "t3" onwards is reflective of a recalibration action that can be periodically repeated henceforth so as to sense changes in the amount of ambient light that is incident upon the photodetector 155 at various times. In contrast, some prior art solutions limit an ambient light sensing operation to only one instant upon startup and fail to perform this operation at subsequent times, thus failing to take into account subsequent changes in ambient light levels.

Because the amount of ambient light incident upon the photodetector 155 has not changed during the time period 660, at time "t4," the capacitor 565 remains connected without additional capacitors being coupled between the gate terminal and the source terminal of the FET 145. Thus, the time constant setting of the sample and hold circuit 510 is left unchanged over the time period 620 between "t4" and "t5" that corresponds to a second measurement period.

Figure 7:
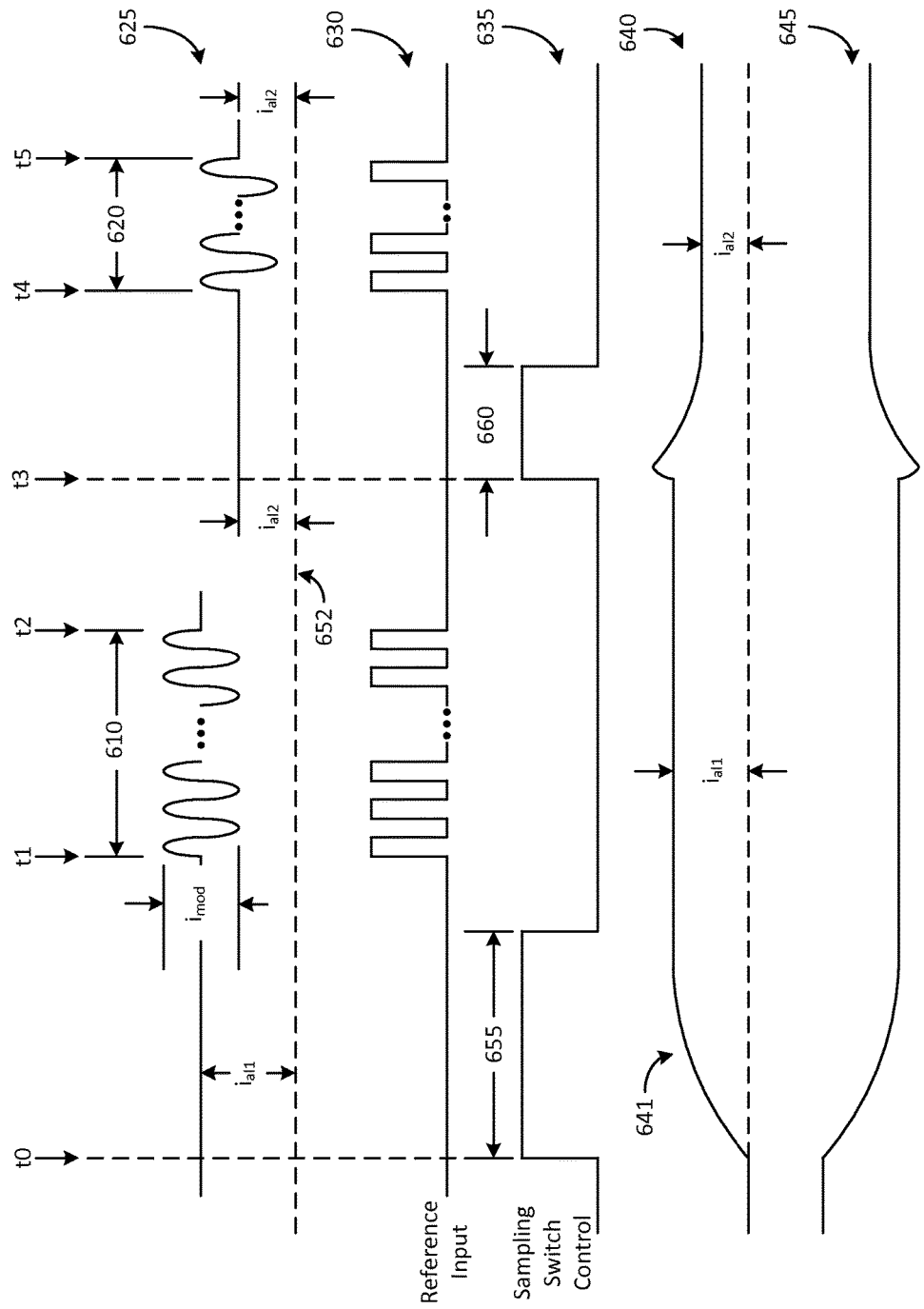
FIG. 7 shows some waveforms associated with a second exemplary optical measurement in accordance with the disclosure.

FIG. 7 shows some waveforms associated with a second exemplary optical measurement in accordance with the disclosure. The various waveforms shown in FIG. 7 prior to the instant "t3" are identical to those shown in FIG. 6. However, in this exemplary optical measurement, at time "t3" that corresponds to a recalibration mode of operation, the ambient light level has changed from a previous level that existed during the initial calibration period (period 655). Specifically, as shown in the waveform 625, the ambient light level "$I_{al2}$" that was present during the time period 655 has dropped to a light level "$I_{al2}$" at time "t3." As a result of the drop, each of the first sense signal on line 511 ("AL_Down") and the second sense signal on line 516 ("AL_Change") turns active. The control logic 545 detects these changes and provides a control signal that actuates one or more switches associated with one or more capacitors in the sample and hold circuit 510. As a result, the time constant provided by the sample and hold circuit 510 during the subsequent hold period (time period 620) is different than the time constant provided by the sample and hold circuit 510 during the initial hold period (time period 610).

The time period 660 corresponding to the recalibration mode of operation is typically smaller than the time period 655 corresponding to the initial calibration mode of operation. The recalibration mode of operation can be repeated at multiple intervals on a regular or irregular basis in order to change the time constant based on any small and/or gradual changes in the level of ambient light incident upon the photodetector 155. The repetitive recalibration mode of operation not only mitigates kTC noise but also allows the correlator 160 to make an accurate determination of integration time corresponding to various time constants. If the recalibration mode of operation is carried out "M" times over an extended period of time, the kTC noise is reduced by a factor of VM. In one exemplary embodiment, the time period 660 is set such that "M" times the time period 660 is equal to the time period 655. The factor "M" defines a maximal jump in ambient light level that can be addressed within the time period 660.

In summary, it should be noted that the invention has been described with reference to a few illustrative embodiments for the purpose of demonstrating the principles and concepts of the invention. It will be understood by persons of skill in the art, in view of the description provided herein, that the invention is not limited to these illustrative embodiments. Persons of skill in the art will understand that many variations can be made to the illustrative embodiments without deviating from the scope of the invention.

What is claimed is:

1. An optical measurement system comprising:
   a photodetector; and
   a sample and hold circuit configured to operate as a current source to the photodetector, the sample and hold circuit comprising:
      a first field effect transistor (FET) coupled in a series arrangement with the photodetector;
      a first switch arranged for selectively coupling a gate terminal of the first FET with a drain terminal of the first FET; and
      a time constant selector circuit coupled to at least the gate terminal of the first FET, the time constant selector circuit comprising a plurality of circuit elements, the plurality of circuit elements including a plurality of capacitors, at least one of the capacitors being individually selectable for setting the sample and hold circuit to provide one of a plurality of time constants.

2. The system of claim 1, wherein the plurality of capacitors comprises an array of capacitors arranged in a parallel configuration, the parallel configuration including an array of selector switches operable to couple one or more capacitors of the array of capacitors between the gate terminal and a source terminal of the first FET.

3. The system of claim 1, further comprising:
   a sensing circuit comprising at least a second FET that is coupled to the first FET in a current mirror configuration, the sensing circuit configured to provide at least one of a current output or a voltage output that is proportional to an amount of current flowing through the first FET and the photodetector.

4. The system of claim 3, wherein the at least a second FET comprises an array of FETs arranged in a parallel configuration.

5. The system of claim 3, further comprising:
   a control circuit configured to automatically use said at least one of a current output or a voltage output to generate one or more control signals for actuating at least one switch in an array of selector switches to select one or more of the plurality of capacitors for setting the sample and hold circuit to provide the one of the plurality of time constants.

6. The system of claim 5, wherein the control circuit comprises an analog-to-digital converter (ADC) circuit.

7. The system of claim 3, further comprising:
   a first comparator configured to use the voltage output of the sensing circuit for generating a first control signal that is indicative of an increase in ambient light between a first instant during which the sample and hold circuit is operative in a sampling mode of operation and a second instant during which the sample and hold circuit is operative in the sampling mode of operation; and
   a second comparator configured to use the voltage output of the sensing circuit for generating a second control signal that is indicative of a decrease in ambient light between the first instant during which the sample and hold circuit is operative in the sampling mode of operation and the second instant during which the sample and hold circuit is operative in the sampling mode of operation.

8. The system of claim 1, further comprising:
   a correlator circuit for detecting a current that flows through the photodetector when the sample and hold circuit is placed in a hold mode of operation, and for calculating a distance between the optical measurement system and a target object by comparing at least one parameter of the current against a reference input signal.

9. An optical measurement system comprising:
   a photodetector; and
   a sample and hold circuit configured to operate as a current source to the photodetector, the sample and hold circuit including a plurality of circuit elements, the plurality of circuit elements including a plurality of capacitors, at least one of the capacitors being individually selectable to provide one of a plurality of time constants when the sample and hold circuit is placed in a sampling mode of operation, the sampling mode of operation characterized by a first amount of current flowing through the photodetector in direct proportion to a first amount of ambient light incident upon the photodetector.

10. The system of claim 9, wherein the sample and hold circuit comprises a first transistor coupled in series with the photodetector.

11. The system of claim 10, wherein the first transistor is a first field effect transistor (FET), and further comprising:
    a switch operable to selectively couple a gate terminal of the first FET with a drain terminal of the first FET when the sample and hold circuit is placed in the sampling mode of operation.

12. The system of claim 11, wherein the plurality of capacitors is arranged in a parallel configuration that includes an array of selector switches operable to couple one or more capacitors of the plurality of capacitors between the gate terminal and a source terminal of the first FET.

13. The system of claim 11, wherein the switch is further operable to decouple the gate terminal of the first FET from the drain terminal of the first FET for placing the sample and hold circuit in a hold mode of operation, the hold mode of operation characterized by a second amount of current flowing through the photodetector in proportion to a combination of the first amount of ambient light and a second amount of light associated with an optical measurement.

14. The system of claim 13, further comprising at least a second FET coupled to the first FET in a current mirror configuration that provides at least one of a current output or a voltage output that is proportional to the first amount of current flowing through the photodetector when the sample and hold circuit is placed in the sampling mode of operation.

15. The system of claim 14, further comprising:
    a control circuit configured to detect a change in said at least one of a current output or a voltage output when the sample and hold circuit is placed in the sampling mode of operation two or more times, the control circuit further configured upon detecting the change, to generate one or more control signals for actuating at least one switch in an array of selector switches to select one or more of the at least one of a plurality of capacitors or a plurality of resistors.

16. The system of claim 15, wherein the at least a second FET comprises a plurality of FETs with each FET configured to provide a different weighting factor.

17. A method of optical measurement, the method comprising:
configuring a sample and hold circuit to operate as a current source to a photodetector;
placing the sample and hold circuit in an initial calibration mode of operation;
exposing the photodetector to ambient light during the initial calibration mode of operation;
configuring the sample and hold circuit to provide one of a plurality of time constants by selectively including one of a plurality of circuit elements in a current flow path of a first current that propagates through the photodetector upon exposing the photodetector to ambient light during the initial calibration mode of operation;
placing the sample and hold circuit in a hold mode of operation; and
using the one of a plurality of time constants provided by the sample and hold circuit to execute an optical measurement procedure during the hold mode of operation wherein the photodetector is exposed to a combination of ambient light and light associated with an optical measurement.

18. The method of claim 17, wherein the optical measurement procedure comprises:
emitting a modulated optical beam towards a target object;
receiving in the photodetector, a portion of the modulated optical beam after reflection from a target object;
detecting a pattern in a portion of a second current propagating through the photodetector upon receiving in the photodetector, the portion of the modulated optical beam after reflection from a target object; and
using the pattern in a correlator to calculate a distance between the photodetector and the target object on an optical time-of-flight basis.

19. The method of claim 18, wherein configuring the sample and hold circuit to operate as the current source to the photodetector comprises coupling a field-effect transistor in series with the photodetector, and wherein placing the sample and hold circuit in a sampling mode of operation comprises actuating a switch to couple a gate terminal of the field-effect transistor to a drain terminal of the field-effect transistor.

20. The method of claim 19, further comprising:
placing the sample and hold circuit in a recalibration mode of operation;
exposing the photodetector to ambient light during the recalibration mode of operation;
generating a control signal by comparing a third current that propagates through the photodetector during the recalibration mode of operation against the first current that propagated through the photodetector during the initial calibration mode of operation; and
using the control signal for selectively including another one of a plurality of circuit elements in the current flow path of the third current.

21. The optical measurement system of claim 1, wherein the first switch is directly coupled to the gate of the first FET and to the drain of the first FET.

22. The optical measurement system of claim 1, wherein the first switch is indirectly coupled to at least one of the gate of the first FET and the drain of the first FET.

* * * * *